Nov. 29, 1932.  L. D. GRISBAUM ET AL  1,889,407
JOURNAL BOX SEALING DEVICE
Filed July 14, 1931   3 Sheets-Sheet 1
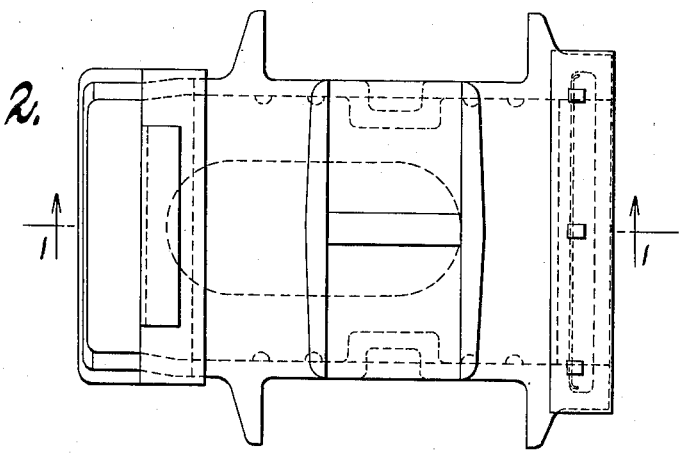
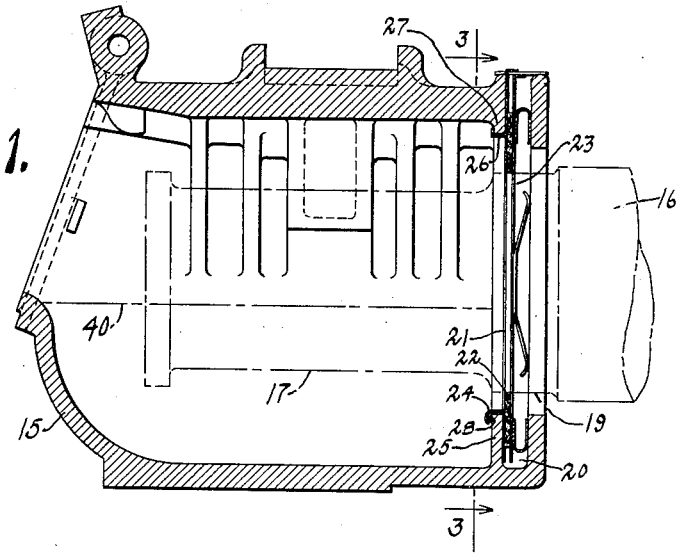
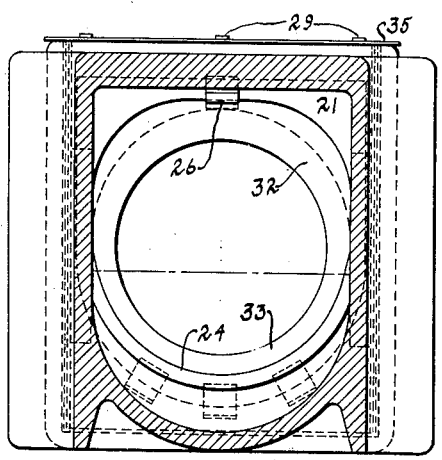
INVENTORS
Leonard D. Grisbaum
William L. Dwyer
Edwin S. Pearce
BY
Synnestvedt & Lechner
ATTORNEYS

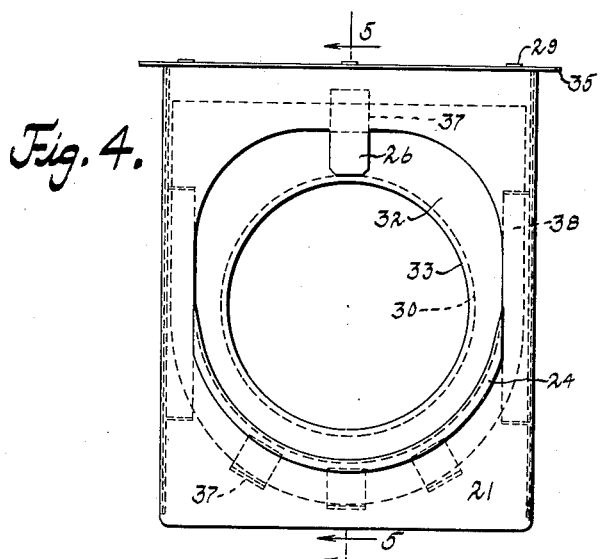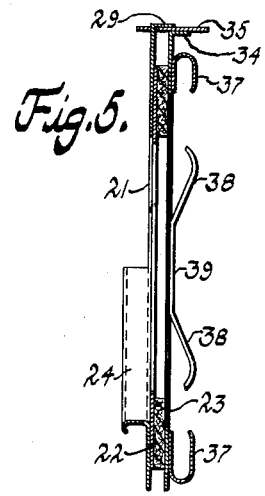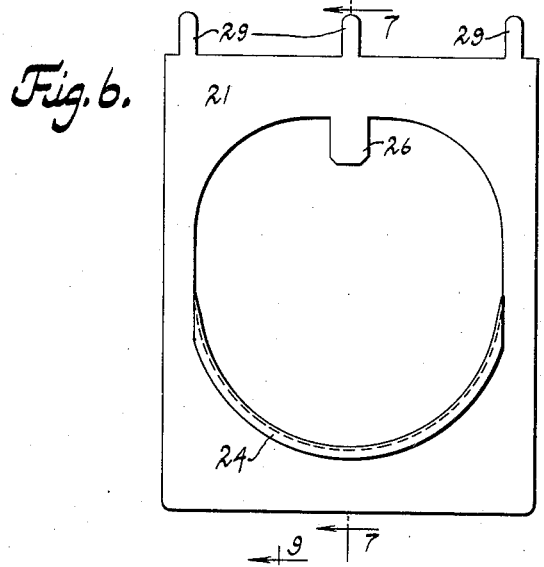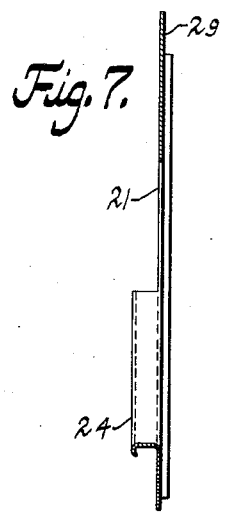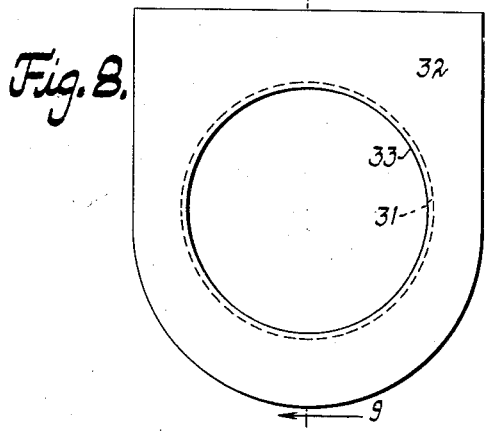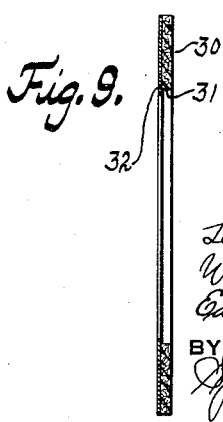

Nov. 29, 1932. L. D. GRISBAUM ET AL 1,889,407
JOURNAL BOX SEALING DEVICE
Filed July 14, 1931   3 Sheets-Sheet 3
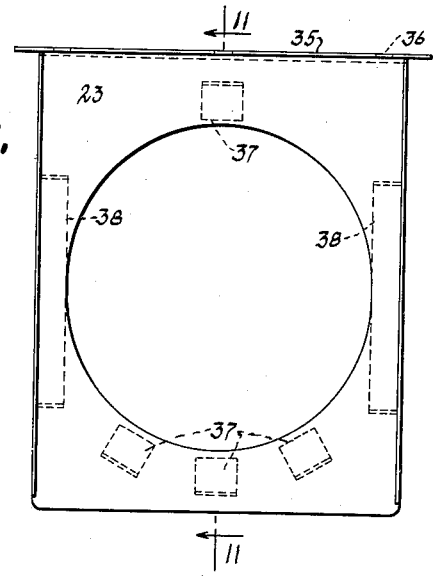
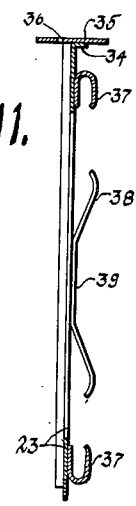
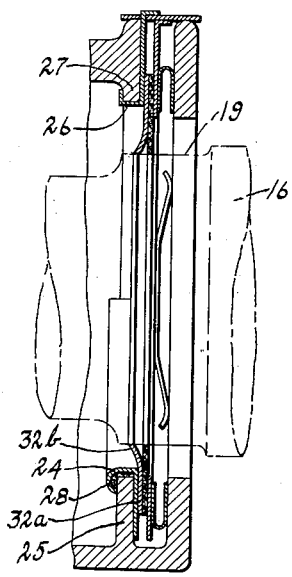
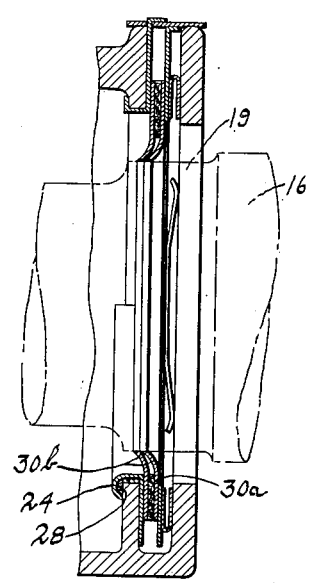
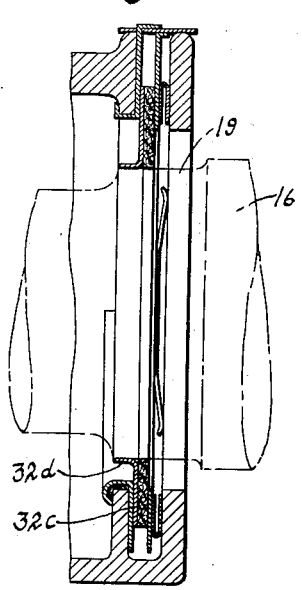

Patented Nov. 29, 1932

1,889,407

UNITED STATES PATENT OFFICE

LEONARD D. GRISBAUM, WILLIAM L. DWYER, AND EDWIN S. PEARCE, OF INDIANAPOLIS, INDIANA, ASSIGNORS TO RAILWAY SERVICE & SUPPLY CORPORATION, OF INDIANAPOLIS, INDIANA, A CORPORATION OF INDIANA

JOURNAL BOX SEALING DEVICE

Application filed July 14, 1931. Serial No. 550,640.

The present invention relates to certain improvements in sealing devices for the customary dust guard cavity of railway vehicle journal boxes.

The principal object of the invention is to provide improved sealing means which will practically eliminate all loss of oil from the cellar and at the same time prevent entrance of all dust and dirt.

More specifically stated the objects of the present invention contemplate the provision of a special dust guard face plate or oil sealing plate which is fixedly secured to the inner wall of the dust guard cavity and provided with suitable lips or shoulders for engaging the back wall of the cavity; the provision of a separately formed dust guard proper which is placed behind the said oil sealing plate; and the provision of a suitable pressure plate between the dust guard and the outer wall of the dust guard cavity, which plate is arranged to exert a yielding pressure on the face of the dust guard sufficient to force it tightly against the surface of the oil sealing plate.

A further object of the invention is to provide a dust guard member of composite construction which will have a necessary rigidity and strength while at the same time providing for a flexible contact upon the axle so as to insure a tight seal.

Still another object of the invention is to provide a device in which the dust guard and the pressure plate can be quickly and easily removed and replaced, as well as an arrangement in which the oil sealing plate, if necessary, can be detached should repair become necessary.

The foregoing, together with such other objects as may appear hereinafter or are incident to our invention, are obtained by means of structure which is illustrated in preferred forms in the accompanying drawings, wherein—

Fig. 1 is a vertical longitudinal section through a railway vehicle axle journal box taken on the line 1—1 of Fig. 2.

Fig. 2 is a plan view of the box of Fig. 1.

Fig. 3 is a section on the line 3—3 of Fig. 1.

Fig. 4 is an elevational view on an enlarged scale of the particular parts in assembled relation which are embodied in our invention.

Fig. 5 is a section on the line 5—5 of Fig. 4.

Fig. 6 is an elevation of the oil sealing plate.

Fig. 7 is a section on the line 7—7 of Fig. 6.

Fig. 8 is a face view of a preferred form of dust guard adapted for use with our invention.

Fig. 9 is a section on the line 9—9 of Fig. 8.

Fig. 10 is a face view of the pressure plate used with our invention.

Fig. 11 is a section on the line 11—11 of Fig. 10, and

Figs. 12, 13 and 14 are vertical longitudinal sections through the dust cavity of an axle journal box illustrating three modifications of our invention.

By referring to the drawings it will be seen that we have illustrated a standard journal box 15 into which is projected the end of the axle 16, the axle being provided of course, with the journal portion 17 and the customary shouldered portion 19 which extends through the dust guard cavity 20.

Our improved sealing device comprises the dust guard face plate or oil sealing plate 21, the dust guard proper 22 and the dust guard pressure plate 23, and it will be seen by reference particularly to Figs. 1 and 5 that the dust guard 22 is located between the sealing plate 21 and the pressure plate 23.

The oil sealing plate is provided with the lower substantially semi-circular lip portion 24 which projects inwardly and downwardly so as to hook over the lower inner wall portion 25 of the dust guard cavity. Above the axle the oil sealing plate is provided with the lug 26 which is shown to best advantage in Fig. 6 and which is adapted to be bent around the upper inner portion 27 of the inner wall of the dust guard cavity as shown to best advantage in Figs. 1, 12, 13 and 14.

There is a central opening in the oil sealing plate 21 as clearly shown in the figures, which is sufficiently large to conveniently permit the passage of the journal, and when the oil sealing plate is placed in position any suitable plastic material 28 is introduced between the lip 24 and the wall portion 25.

It will, therefore, be seen that the sealing plate is firmly held in a fixed position and that the inwardly and downwardly turned lip 24, in combination with the plastic material 28, will very effectively seal the connection between the wall portion 25 and the plate proper so as to prevent the possibility of oil from siphoning out under the lip of the sealing plate and entering the dust guard cavity from which it will be lost.

Along the upper edge of the sealing plate 21 we prefer to provide a series of upstanding lugs 29 which are shown to best advantage in Fig. 6. The purpose for these lugs will appear hereinafter in connection with the description of the balance of the structure.

We form the outer face, i. e., the face toward the center of the axle, with as smooth a surface as possible so that the dust guard proper 22 can have thorough and complete contact therewith. A smooth surface on a sealing plate of our improved type is much more readily provided for than it would be on the inside of the dust cavity proper, the cavity, of course, being cast in the journal box and the walls thereof not ordinarily being machined.

The dust guard shown in Fig. 1 is a simple fiber plate which snugly fits the shoulder portion 19 of the axle 16. We prefer to construct the dust guard in the manner shown in detail in Figs. 8 and 9, from which figures it will be seen that there is a hard fiber portion 30 having an opening 31 which is just large enough to pass the shoulder portion 19 of the axle. Adjacent this hard portion 30 is a flexible fiber portion 32 which has an opening 33 slightly smaller than the opening 31 and which is adapted to form a sealing lip on the shoulder 19 in the manner shown in Figs. 12, 13 and 14, although Figs. 12, 13 and 14 illustrate slight modifications of the idea. It is to be understood, of course, that the flexible fiber portion 32 and the sealing lip 33 are not essential to the invention, as a plain fiber dust guard 22 such as shown in Fig. 1 can be used, although we prefer the structure illustrated in Figs. 8 and 9 because it forms a better seal. The two portions 30 and 32 may be secured together in any suitable or desired manner.

The pressure plate 23 is bent over at the top to provide a flange 34 to which is secured a dust cavity cover plate 35. The cover plate 35 is provided with suitable openings 36 through which the upstanding lugs 29 on the sealing plate 21 are adapted to project, after which the lugs 29 can be bent down over the cover 35 as shown very clearly in Figs. 4 and 5.

Between the back wall of the dust guard cavity and the plate 23 proper we provide a series of spring members 37 and 38, the members 37 taking the form of U-shaped leaf springs and the members 38 the form of rather elongated flat leaf springs having the central portion 39 thereof secured to the plate 23 as clearly shown in Figs. 10 and 11. There is one spring 37 at the top of the axle and three springs 37 at the bottom and a spring 38 at each side, although any other suitable arrangement of springs might be used.

In the modification shown in Fig. 12 the portion 32a which forms the lip 32b against the axle is made of felt instead of flexible fiber as in Figs. 8 and 9.

In Fig. 13 the hard fiber portion 30a has a central opening which is of greater diameter than the shoulder 19 and a flexible fiber portion 30b is fitted to each side of the hard portion and both portions 30b are adapted to form sealing lips against the axle as shown.

In Fig. 14 the flexible fiber portion 32c has a somewhat smaller opening than in the other figures so that it forms a lip 32d of greater width having a larger bearing surface against the shoulder 19, as clearly shown in the drawings.

It will, therefore, be seen that we have provided not only a very efficient dust guard but also a complete oil seal, in which connection it should be noted that the journal box is generally packed to a height approximately as shown by the line 40 in Fig. 1. Our improved sealing means practically eliminates all oil leakage or wastage because it prevents the oil from siphoning out past the dust guard as occurs in present practice where the dust guards are free to float in the dust guard cavity proper. In our device the oil sealing plate is rigidly held in place and the dust guard floats under pressure between the sealing plate and the pressure plate, both plates being formed with perfectly smooth faces for contact with the dust guard.

We claim:—

1. In a sealing device for the dust guard cavity of an axle journal box, the combination of an oil sealing plate, a follower plate, said plates being fixed in the box with respect to motion in a direction transverse of the axle, a dust guard between said plates movable with the axle, and means for yieldingly pressing the follower plate against said dust guard.

2. In a sealing device for the dust guard cavity of an axle journal box, the combination of an oil sealing plate fixedly secured to the inner wall of said cavity, a readily removable follower plate carrying a cover member for the cavity, a dust guard movable between said plates, and means for yieldingly pressing the follower-plate against said dust guard to seat the latter tightly against the oil sealing plate.

3. Means for sealing a journal box including in combination with the dust guard cavity, an oil sealing plate fixedly secured adjacent the inner wall of said cavity provided with a lip portion projecting over the inner wall, plastic sealing means between the wall and said lip, and a dust guard member behind said plate.

4. Means for sealing a journal box including in combination with the dust guard cavity, an oil sealing plate fixedly secured adjacent the inner wall of said cavity, a dust guard behind said plate, and a follower plate carrying a cover member for the cavity.

5. Means for sealing a journal box including in combination with the dust guard cavity, an oil sealing plate fixedly secured adjacent the inner wall of said cavity and provided with a lip portion projecting over the inner wall, plastic sealing means between the wall and said lip, and a dust guard member behind said plate, together with means for yieldingly pressing the dust guard against the sealing plate.

6. Means for sealing a journal box including in combination with the dust guard cavity, an oil sealing plate adjacent the inner wall of said cavity, said plate being provided with an opening for receiving the journal which is sufficiently greater in diameter than the diameter of the journal to prevent the journal from moving the plate, a follower plate yieldingly urged toward said sealing plate and a dust guard pressed by the follower plate against the sealing plate and movable therebetween.

7. In a sealing device for the dust guard cavity of an axle journal box, the combination of an oil sealing plate adjacent the inner wall of said cavity fixed against movement transverse of the axle, a follower plate yieldingly urged toward said sealing plate and a dust guard pressed by the follower plate against the sealing plate and movable with the axle between said plates.

8. In a sealing device for the dust guard cavity of an axle journal box, the combination of an oil sealing plate adjacent the inner wall of said cavity fixed against movement transverse of the axle, a follower plate yieldingly urged toward said sealing plate and a dust guard movable with the axle between said plates, said dust guard having a flexible lip portion bearing on the axle.

9. In a sealing device for the dust guard cavity of an axle journal box, the combination of an oil sealing plate adjacent the inner wall of said cavity fixed against movement transverse of the axle and provided with an inwardly extending lip below the center of the journal which is adapted to be hooked over the lower portion of the inner wall of said cavity, a dust guard behind said plate, and a pressure plate behind said dust guard, the dust guard being movable between the plates.

In testimony whereof we have hereunto signed our names.

LEONARD D. GRISBAUM.
WILLIAM L. DWYER.
EDWIN S. PEARCE.